United States Patent
Strong et al.

(10) Patent No.: US 9,442,729 B2
(45) Date of Patent: Sep. 13, 2016

(54) MINIMIZING BANDWIDTH TO TRACK RETURN TARGETS BY AN INSTRUCTION TRACING SYSTEM

(71) Applicants: Beeman C. Strong, Portland, OR (US); Matthew C. Merten, Hillsboro, OR (US); Tong Li, Portland, OR (US)

(72) Inventors: Beeman C. Strong, Portland, OR (US); Matthew C. Merten, Hillsboro, OR (US); Tong Li, Portland, OR (US)

(73) Assignee: Intel Corporation, Santa Clara, CA (US)

(*) Notice: Subject to any disclaimer, the term of this patent is extended or adjusted under 35 U.S.C. 154(b) by 640 days.

(21) Appl. No.: 13/890,654

(22) Filed: May 9, 2013

(65) Prior Publication Data

US 2014/0337604 A1    Nov. 13, 2014

(51) Int. Cl.
*G06F 9/30* (2006.01)
*H04L 29/06* (2006.01)
*G06F 9/38* (2006.01)
*G06F 11/36* (2006.01)
*G06F 11/34* (2006.01)

(52) U.S. Cl.
CPC ......... *G06F 9/30145* (2013.01); *G06F 9/3806* (2013.01); *G06F 9/3857* (2013.01); *G06F 11/3476* (2013.01); *G06F 11/3636* (2013.01)

(58) Field of Classification Search
CPC ................. G06F 2201/865; G06F 2201/86
See application file for complete search history.

(56) References Cited

U.S. PATENT DOCUMENTS

| 2003/0005271 | A1* | 1/2003 | Hsu | G06F 9/3802 712/237 |
| 2004/0024995 | A1* | 2/2004 | Swaine | G06F 11/25 712/227 |
| 2004/0133777 | A1* | 7/2004 | Kiriansky | G06F 21/554 713/166 |
| 2012/0117362 | A1* | 5/2012 | Bhargava | G06F 9/3848 712/239 |
| 2012/0311307 | A1  | 12/2012 | Chynoweth et al. | |
| 2013/0007424 | A1* | 1/2013 | Gorton, Jr. | G06F 9/30058 712/239 |
| 2014/0337604 | A1* | 11/2014 | Strong | G06F 9/30145 712/205 |

OTHER PUBLICATIONS

Brandt et al., PCT Application No. PCT/US2011/068287, filed on Dec. 31, 2011, titled "Real Time Instruction Tracing Compression of RET Instructions", 45 pages.

* cited by examiner

*Primary Examiner* — Hyun Nam
(74) *Attorney, Agent, or Firm* — Lowenstein Sandler LLP

(57) ABSTRACT

A processing device implementing minimizing bandwidth to track return targets by an instruction tracing system is disclosed. A processing device of the disclosure an instruction fetch unit comprising a return stack buffer (RSB) to predict a target address of a return (RET) instruction corresponding to a call (CALL) instruction. The processing device further includes a retirement unit comprising an instruction tracing module to initiate instruction tracing for instructions executed by the processing device, determine whether the target address of the RET instruction was mispredicted, determine a value of call depth counter (CDC) maintained by the instruction tracing module, and when the target address of the RET instruction was not mispredicted and when the value of the CDC is greater than zero, generate an indication that the RET instruction branches to a next linear instruction after the corresponding CALL instruction.

20 Claims, 12 Drawing Sheets

US 9,442,729 B2

MINIMIZING BANDWIDTH TO TRACK RETURN TARGETS BY AN INSTRUCTION TRACING SYSTEM

TECHNICAL FIELD

The embodiments of the disclosure relate generally to processing devices and, more specifically, relate to minimizing bandwidth to track return targets by an instruction tracing system.

BACKGROUND

An instruction tracing system (ITS) of a processor provides a debug feature, including a control flow trace that can log what instructions are being executed by a processor. The ITS typically produces a sequential log of the instructions executed by a processor by generating packets specifying branch resolution information, including target information of indirect branches. Because return (RET) instructions are usually the most frequent indirect branches, a sizeable portion of the trace output and bandwidth of the ITS is consumed by packets generated by RET instructions. This bandwidth contributes to computational overhead that does not directly solve a problem handled by the processor.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
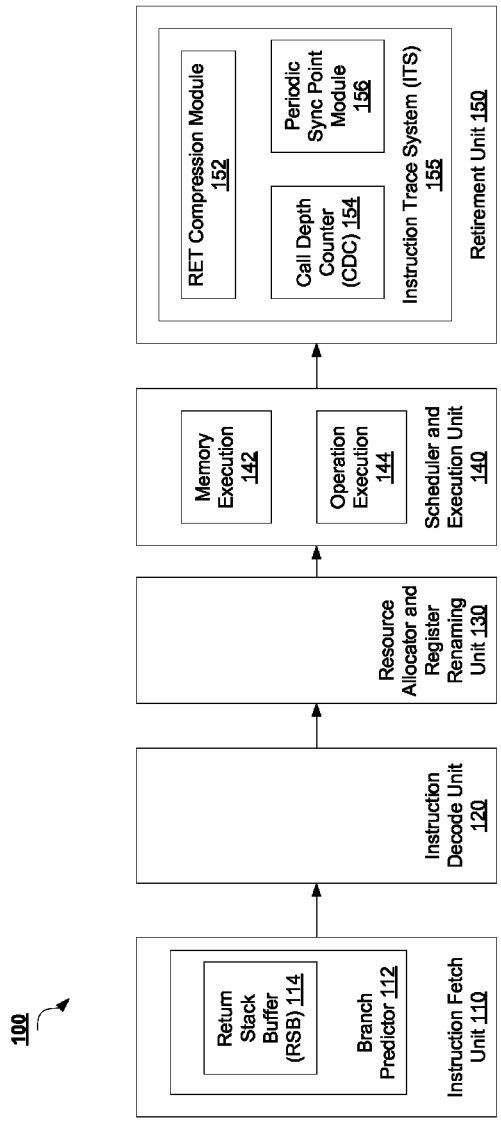
FIG. 1 illustrates an exemplary architecture in accordance with which embodiments may operate including an instruction tracing system (ITS) architecture that minimizes bandwidth to track return (RET) targets.

Embodiments of the disclosure implement techniques to minimize bandwidth to track return targets by an instruction tracing system (ITS). In particular, improved return (RET) instruction compression can be provided as a bandwidth-saving feature of an ITS component of a processor. In assembly language, a call (CALL) instruction transfers control to another procedure, and the corresponding RET instruction of that other procedure returns control to the instruction following the CALL instruction.

CALLs and RETs can programmatically alter an application's software stack maintained by a processor. That is, CALLs push the next linear instruction pointer (NLIP) of the CALL onto the application's software stack and then branch to the target instruction pointer of the CALL. RETs pop an instruction pointer off of the application's software stack and then branch to that popped address. The processor may utilize a return predictor to speculatively begin fetching instructions from the return target prior to the actual execution (pop and branch) of the RET instruction. In embodiments of the disclosure, the ITS component leverages such a return predictor (e.g., return stack buffer (RSB)) of the processor as an indicator of which RETs are "well-behaved" and can have their targets compressed, and which are not "well-behaved" and have their targets listed explicitly in the ITS trace log (i.e., not compressed). "Well-behaved" RETs may be RET instructions with targets that match the next linear instruction pointer (NLIP) of a corresponding CALL instruction associated with the RET.

The RET compression of embodiments of the disclosure compresses RETs with targets that can be accurately inferred by an ITS decoder receiving the ITS packets. Otherwise, the ITS decoder may make an improper assumption about the RET target, causing it to lose track of the control flow, and to waste valuable trace data. More specifically, embodiments of the disclosure utilize misprediction signals sent throughout the processor architecture and a call depth counter (CDC) maintained by the ITS logic to determine when to compress a RET instruction.

Previously, solutions for RET compression by an ITS utilized a dedicated ITS return address buffer with very limited depth and costly comparator logic. Essentially, in the previous solutions, a dedicated and specialized RSB was provided to the ITS, where the NLIP of a CALL instruction was pushed onto the ITS's RSB stack, and a RET removed the top NLIP on the ITS's RSB stack. Previous solutions then compressed the return target if the removed address and the actual target address of the RET instruction matched (where the determination of the match required dedicated comparator logic in the ITS). Note that the ITS decoder that processes the ITS packets replicated the ITS's RSB when decoding a trace in order to produce the proper target for a compressed RET.

In comparison, embodiments of the disclosure leverage existing hardware of the processor (e.g., the RET predictor) so that RETs that can be predicted correctly by the RET predictor (RSB) can be compressed, as long as the functionality employed to predict it can be reasonably simulated by the decoder of the trace (e.g., an ITS decoder). The use of comparator logic and target address storage by the ITS is avoided, thus saving area and power in the processor.

Furthermore, this makes it far less costly to compress RETs at greater depths, which further reduces the bandwidth used by the ITS.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates an exemplary architecture 100 in accordance with which embodiments may operate, where the architecture 100 is an ITS architecture that minimizes bandwidth to track return (RET) targets. Architecture 100 may include processor components such as, but not limited to, instruction fetch unit 110, instruction decode unit 120, resource allocator and register renaming unit 130, scheduler and execution units 140, and retirement unit 150.

Instruction fetch unit 110 may fetch instructions from memory and feed them to instruction decode unit 120, which, in turn, decodes or interprets them. For example, in one embodiment, the instruction decode unit 120 decodes a received instruction into one or more operations called "micro-instructions" or "micro-operations" (also called micro op or uops) that the processor can execute. In other embodiments, the instruction decode unit 120 parses the instruction into an opcode and corresponding data and control fields that are used by the architecture 100 to perform operations in accordance with one embodiment.

In one embodiment, the resource allocator and register renaming unit 130 is where the uops from instruction decode unit 120 are prepared for execution. Resource allocator logic of unit 130 allocates machine buffers and resources that each uop uses to execute. Register renaming logic of unit 130 renames logic registers onto entries in a register file. The resource allocator may also allocate an entry for each uop in one of two uop queues, one for memory operations and one for non-memory operations The scheduler and execution unit 140 includes logic to schedule and execute renamed uops. For instance, uop schedulers may determine when a uop is ready to execute based on the readiness of their dependent input register operand sources and the availability of the execution resources the uops need to complete their operation. The schedulers arbitrate for the dispatch ports to schedule uops for execution. Furthermore, execution cluster(s) may include a set of one or more execution units 144 and a set of one or more memory access units 142. The execution units 144 may perform various operations (e.g., shifts, addition, subtraction, multiplication) and operate on various types of data (e.g., scalar floating point, packed integer, packed floating point, vector integer, vector floating point).

The retirement unit 150 can receive completed uops from the scheduler and execution unit 140 for retirement. In one embodiment, the retirement unit 150 includes a real time instruction trace unit (ITS) 155 to minimize bandwidth to track RET targets. ITS 155 outputs a trace stream that details what instructions were executed by the scheduler and execution unit 140 by generating packets with branch resolution information, including target information of indirect branches. In embodiments of the disclosure, ITS 155 includes RET compression module 152 to compress select RET instructions. This figure does not illustrate ITS software (e.g., ITS decoder) that is used to interpret the packets sent from ITS 155.

In some embodiments, a retirement buffer (not shown) of the retirement unit 150 may temporarily store retired instructions. This buffer may be communicably interfaced to ITS 155, which itself includes several components whose functions are discussed below. In one embodiment, the ITS RET compression relies on an understanding of the workings of a Return Stack Buffer (RSB) 114 of a branch predictor 112 of the instruction fetch unit 110. The RSB 114 is a special, dedicated predictor mechanism of the branch predictor 112 used for predicting targets of RET instructions. In some embodiments, the RSB 114 is also known as a RET predictor.

In one embodiment, each time a CALL instruction is seen at the instruction fetch unit 110, the RSB 114 pushes the CALL's next linear instruction pointer (NLIP) onto a stack of the RSB 114, and adjusts a top-of-stack (TOS) of the RSB 114 to point to this entry. When a RET is predicted, the target pointed to by the TOS entry is popped off of the stack and used as the predicted target, and the TOS pointer is moved to the prior CALL's NLIP entry in the RSB 114. Implementations of the RSB 114 may vary depending upon the particular architecture on which it operates. For example, the location of the RSB 114 in the pipeline, supported CALL depth, and specific behavior may vary from one implementation to the next.

Embodiments of the disclosure utilize the stack-based nature of the RSB 114 as an indicator of which RETs are "well-behaved" and can have their targets compressed, and which are not "well-behaved" and should have the entire address of their targets listed explicitly in the ITS 155 trace log (i.e., not compressed). In one embodiment, "well-behaved" refers to RET instructions with targets that match the NLIP of the corresponding CALL instruction.

Embodiments of the disclosure provide improved RET compression as a bandwidth-saving feature of the ITS 155. The RET compression can be implemented to compress RETs with targets that can be accurately inferred by an ITS decoder (not shown) that receives the ITS 155 packets. Otherwise, the ITS decoder may make an improper assumption about the RET target, causing it to lose track of the control flow, and to waste valuable trace data.

In one embodiment, ITS 155 compresses a RET by inserting a flag (e.g., a bit) into the ITS trace log, indicating that the RET instruction is correctly predicted from the RSB 114. The ITS decoder that is used to interpret the packets sent from ITS 155 then is aware that it can interpret the RET target from the corresponding CALL of the trace log. If the RET is not to be compressed, then the ITS 155 may send a full (e.g., 48-bit) target address for the RET as part of the trace log.

In one embodiment, each conditional branch outcome is recorded into a packet as a flag (e.g. a bit) into the trace log. To increase efficiency, sequentially executed conditional branch outcomes can be compressed into a single packet, where a sequence of flag bits are stored corresponding to the outcomes of those conditional branches. As the ITS decoder walks through the binary code and encounters a conditional branch, the ITS decoder consumes one bit from the sequence of bits stored in the conditional branch output packet, and follows the control flow path (taken or not taken) indicated by that bit. In one embodiment, an inserted flag bit representing a compressed return may be intermixed into the sequence of bits inside an ITS packet representing the taken/not-taken outcomes of conditional branches. As the ITS decoder walks the binary code consuming bits in the sequence stored in the packet, and it may encounter a RET instruction. If there is a flag bit set to true in the sequence, then the ITS decoder can consume the bit and understand that the RET instruction has a compressed address.

If, when the ITS decoder walks to a RET instruction, and the conditional branch outcome packet has terminated and a new conditional branch packet is encountered with the first flag bit set to true, then the decoder can consume the bit and understand that the RET instruction has a compressed address. If, when the decoder walks to a RET instruction, and the conditional branch outcome packet has terminated and a taken target packet is encountered, the ITS decoder can assume an uncompressed RET, consume the packet, and proceed to the instruction pointer address stored in the said taken target packet.

Accordingly, in embodiments of the disclosure, ITS 155 implements two conditions by which the RET compression algorithm abides. First, all RETs with targets that do not match the NLIP of the corresponding CALL (i.e., not "well-behaved") should not be compressed. Second, RETs with corresponding CALLs that have not been seen by the ITS decoder should not be compressed, even if they are "well-behaved." With respect to the second condition, the RET compression algorithm of ITS 155 relies on the ITS decoder to store CALL NLIPs as part of the trace log, so that they can be used when RETs are compressed and no target is provided in the trace log. As such, if the CALL was not part of the trace log, the ITS decoder is not able to apply the proper target if the matching RET is compressed. Furthermore, in one embodiment, the trace log is divided up into smaller sections separated by one or more boundary packets (BPs), which provide the ITS decoder with relevant state information such that the ITS decoder can start decoding at those boundary points without starting from the very beginning of the trace log. Thus, if the CALL was not part of the trace log section in which a RET was seen, the full target is inserted into the trace log.

In one embodiment, well-behaved RETs may be correctly predicted (up to a depth of 'N' of the RSB 114), while non-well-behaved RETs and RETs beyond depth N are assumed to mispredict (even if that is not the case in the execution flow). Thus, the RET compression module 152 may be able to compress all RETs that are correctly predicted and within the depth of the RSB 114. One example RSB 114 may maintain an N-deep CALL stack, and a TOS pointer to indicate the RSB entry from which the next RETs predicted target will be taken. As such, this example RSB can accurately predict the target for RETs up to a depth of N. At any greater depth, the RSB underflows, wrapping around the RSB stack, and no longer has accurate NLIP information for the next shallower RET. Thus, mispredictions may likely ensue for any subsequent RETs that execute after the last N deep RETs.

As the ITS 155 is part of the retirement unit 150 and the overall processor pipeline, it receives signals from the execution unit 140 indicating any RET mispredictions. The execution unit determines if there was a misprediction by comparing the instruction pointer popped from the application's software stack with the target predicted by the RSB. When these RET mispredict signals are received, the RET compression module 152 does not compress the corresponding RET at the ITS 155, since these RETs may be not "well-behaved".

Unfortunately, there are also scenarios where the RSB 114 could correctly predict a non-well-behaved RET, and any such scenario risks ITS decoder confusion if the RET is compressed. For example, depending on the sophistication of the RSB 114, there can be many scenarios where the RSB could predict a target that is inconsistent with the CALL stack and, at the same time, could happen to be the correct prediction. If this happens, the RET is implicitly a non-well-behaved RET since the RET target is not consistent with the CALL stack. As such, the RET compression module 152 should avoid compressing this RET.

Two scenarios where the RSB 114 may predict a target that is inconsistent with the CALL stack in various scenarios include an RSB 114 underflow, and speculative/bogus instructions that update the RSB 114.

First, an RSB 114 underflow may occur if more RETs than CALLs are seen by the RSB 114, or if the CALL stack depth exceeds the depth of the RSB (and wraps around to the bottom of the RSB). In either case, the RSB 114 holds the last N deep targets seen, and hence can accurately predict the "lowest" (e.g., most recent) N RETs. For the remaining underflowed RETs, the RSB 114 provides a default prediction. For example, this default prediction could be static (i.e., the RET NLIP, or the same target as the last RET), or dynamic (i.e., prediction from another predictor). But in any case, there is a risk that the target could be inconsistent with the CALL stack.

Second, speculative and/or bogus CALL and/or RET instructions are instructions that will not be committed (i.e., in the speculative path of a mispredicted branch or other pipeline flush). If such instructions update the RSB 114, those entries should be invalidated or repaired. Any use of these bogus entries to predict non-bogus RETs is likely to produce predictions inconsistent with the CALL stack. It is the handling of these types of pipeline flushes that separates simple RSBs from the state-of-the-art. A sophisticated RSB can restore the TOS to the pre-flush location, and can restore any modified entries. A simple RSB may do nothing, allowing RETs to predict from bogus entries (most likely incorrectly).

To account for the above-described "lucky guess" scenarios, embodiments of the disclosure implement protections to prevent such correctly-predicted RETs from compressing. The ITS 155 may maintain a CALL depth counter (CDC) 154 to provide this protection. The size of the CDC 154 depends on the depth of the RSB 114, such that the CDC 154 should saturate when/before the RSB 114 depth (N) is reached. For example, the CDC 154 may be 5 bits wide, covering an 'N' of 32. When the CDC reaches the max depth of N, it no longer increments beyond N (i.e., it saturates). This supports compressing RET targets for return predictions that come from valid RSB entries and not from wrap-around entries.

In embodiments of the disclosure, the CDC 154 increments on retirement of any CALL that updates the RSB 114, decrements on retirement of any RET that predicts from the RSB 114, and resets for any scenario that could cause the RSB to predict a target that is not consistent with the CALL stack, as described above. As a result, in embodiments of the disclosure, the RET compression module 152 compresses a RET if it is (1) predicted correctly (e.g., no misprediction signals received) and (2) if CDC 154 is greater than 0. By establishing a condition of the CDC 154 being greater than 0, compression of any underflowed RETs is avoided, (due to the counter saturating, or ceasing to decrement, at 0). This addresses the first RSB 114 "lucky guess" scenario discussed above. The other (second) RSB 114 "lucky guess" scenario discussed above of speculative/bogus instructions updating the RSB 114 is handled by configuring reset conditions of the CDC 154, as discussed further below.

In embodiments of the disclosure, reset conditions of the CDC 154 should be tailored to the RSB 114 behavior. The following are example scenarios that may cause the CDC 154 to be reset:

(1) RET Mispredict

In one embodiment, any time a RET is mispredicted, it is assumed that the RSB's 114 CALL stack has become out-of-sync with a software CALL stack of the processor, and hence predictions from the existing entries may not be consistent with the software CALL stack. For example, this behavior is likely if software manipulates the CALL stack, by pushing a RET target onto the stack by means other than a CALL. By resetting the CDC 154 when a RET mispredicts, the ITS 155 can ensure that only RETs that correspond to future/younger CALLs can be compressed, and hence RET predicted from the older, out-of-sync entries will not compress.

(2) All Mispredicts, or Other Pipeline Flush

Depending on the recovery capabilities of the RSB 114, the CDC 154 may be reset on any pipeline flush. In some embodiments, an advanced RSB 114 may be able to recover precisely, in which case no reset is performed. But in any scenario where an entry updated by a bogus/speculative CALL could be used to predict a future RET, the CDC 154 should be reset. This ensures that RETs predicted by existing (possibly bogus) entries are not compressed.

(3) Disable of ITS Tracing

In one embodiment, a CALL that executes while ITS 155 tracing is disabled does not increment the CDC 154, and hence the corresponding RET is not compressed (even if tracing is enabled when it executes). ITS tracing could be disabled by clearing of the enable bit, buffer overflow, software leaving the tracing context or IP range, etc. In any of these cases the CDC 154 is reset, and remains reset until tracing resumes. This is because the ITS decoder does not see the CALL to insert into a call stack tracker that is maintained by the ITS decoder.

(4) ITS Sync Point

ITS 155 includes a periodic synchronization (sync) point module 156 that issues a periodic sync packet, called a boundary packet (BP). This BP packet serves as a starting point for the ITS decoder, allowing it align on packet boundaries when either beginning to decode, skipping to a new section of the trace log, or recovering from a decode error. Along with the cases above, this ITS sync point reset condition serves to assure that RETs with corresponding CALLs that have been seen by the ITS decoder are compressed. Because any BP could be an ITS decoder starting point, no RET with a corresponding CALL preceding the prior BP should be compressed.

Figure 2:
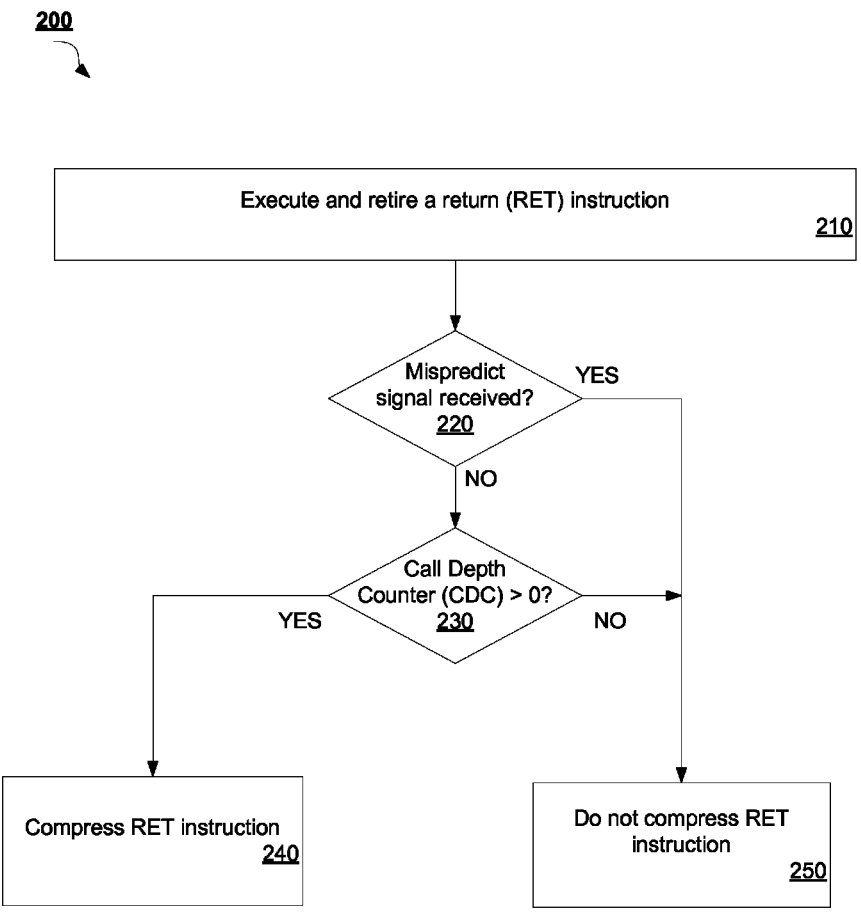
FIG. 2 is a flow diagram illustrating a method for minimizing bandwidth to track return targets by an ITS according to an embodiment of the disclosure.

FIG. 2 is a flow diagram illustrating a method 200 for minimizing bandwidth to track return targets by an ITS according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by ITS 155 of FIG. 1.

Method 200 begins at block 210 where a RET instruction is executed and retired. Then, at decision block 220, the ITS determines whether a mispredict signal has been received corresponding to the RET instruction. If so, then method 200 proceeds to block 250 where the RET instruction is not compressed for purposes of generating packets for the instruction trace log of the ITS. If there is no misprediction signal corresponding to the RET instruction, then method 200 proceeds to decision block 230.

At decision block 230, the ITS determines whether a CDC maintained by the ITS is greater than 0. If not, then method 200 proceeds to block 250, where the RET is not compressed. On the other hand, if the CDC is greater than 0 at decision block 230, then method 200 proceeds to block 240, where the RET instruction is compressed by the ITS for the instruction trace log. In one embodiment, the RET compression includes inserting a 1-bit indication (e.g., flag) into the trace log to indicate that the RET instruction is correctly predicted from the corresponding CALL.

Figure 3:
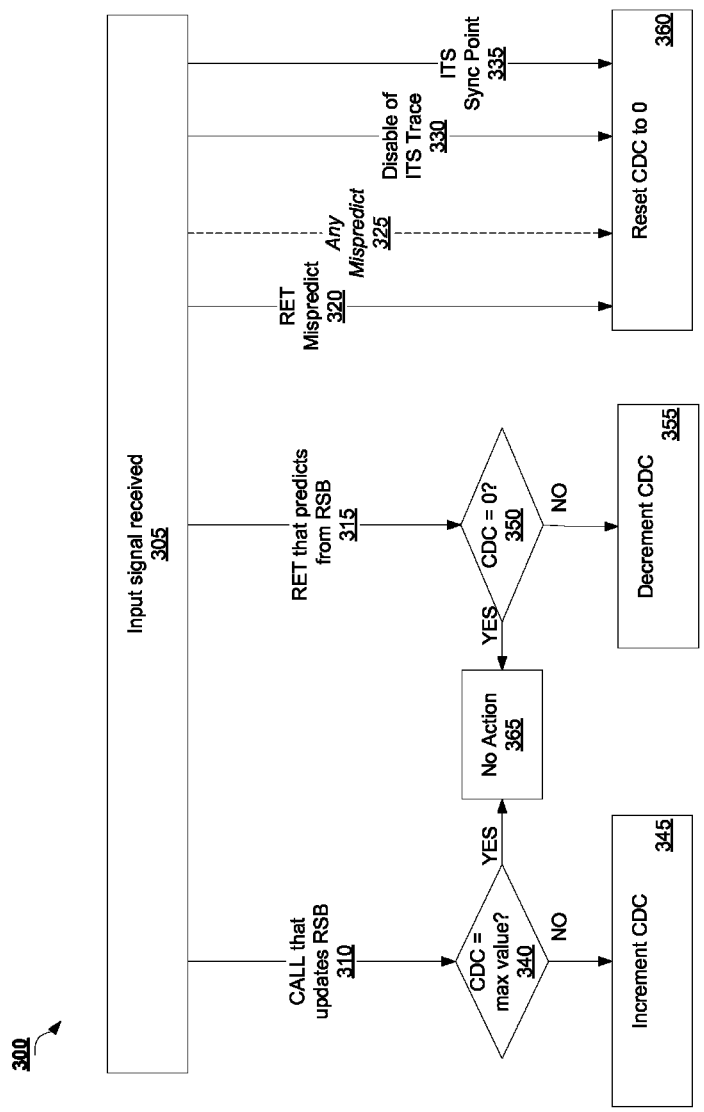
FIG. 3 is a flow diagram illustrating another method for maintaining a CDC for minimizing bandwidth to track return targets by an ITS according to another embodiment of the disclosure.

FIG. 3 is a flow diagram illustrating another method 300 for maintaining a CDC for minimizing bandwidth to track return targets by an ITS according to another embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by ITS 155 of FIG. 1.

Method 300 begins at block 305 where an input signal is received by the ITS. A variety of input signals may be received by the ITS, as depicted by arrows 310-335. At arrow 310, an indication of a CALL that updates the RSB is received. In this case, method 300 proceeds to decision block 340 where it is determined whether the CDC is equal to a maximum value of the CDC. In one embodiment, the maximum value is configured to be equal to the depth of the RSB of the processor. If the current CDC value is equal to the max value, then method 300 proceeds to block 365 where no action is taken with respect to the CDC. If the CDC is not equal to its maximum value at decision block 340, then method 300 proceeds to block 345 where the CDC is incremented. In one embodiment, the CDC is incremented by 1.

At arrow 315, an indication of a RET that predicts from the RSB is received. In this case, method 300 proceeds to decision block 350, where it is determined whether the current CDC value is equal to 0. If so, then method 300 proceeds to block 365 where no action is taken with respect to the CDC. On the other hand, if the CDC is not equal to 0, then method 300 proceeds to block 355 where the CDC is decremented. In one embodiment, the CDC is decremented by 1.

Arrows 320-335 are all signals that cause a reset condition for the CDC. Arrow 320 is a RET mispredict signal. Arrow 325 is a mispredict signal of any type (RET mispredict as well as all other mispredicts). In some embodiments, when an advanced RSB is implemented that can recover from non-RET mispredicts, this signal may be an optional reset condition for the CDC, as indicated by the dashed line in the figure. Arrow 330 is a signal that indicates when the ITS trace function is disabled. Arrow 335 is an indication of an ITS sync point (e.g., a BP packet). When any of these signals 320-335 are received, method 300 to proceeds to block 360, where the CDC is reset to 0.

Figure 4A:
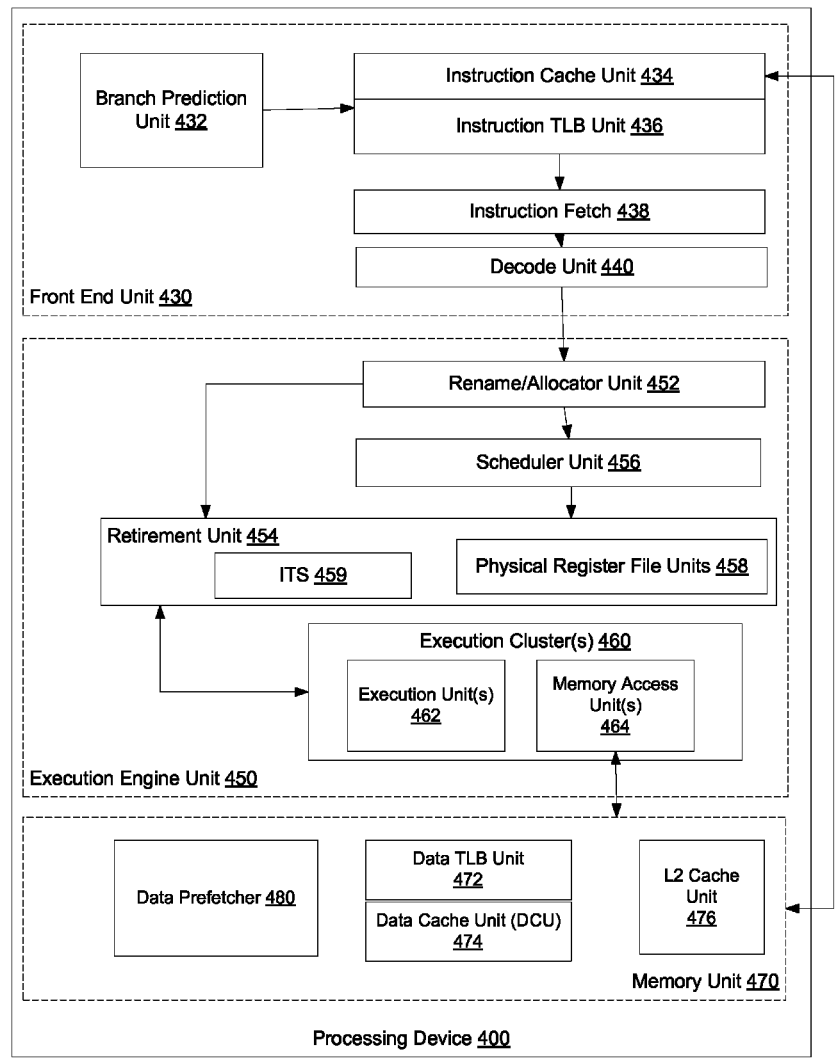
FIG. 4A is a block diagram illustrating a micro-architecture for a processor that implements minimizing bandwidth to track return targets by an ITS in which one embodiment of the disclosure may be used.

FIG. 4A is a block diagram illustrating a micro-architecture for a processor 400 that implements minimizing bandwidth to track return targets by an ITS in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one embodiment, the retirement unit 454 includes an ITS 459 component to minimize bandwidth to track return targets. ITS 459 may be the same as ITS 155 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4B:
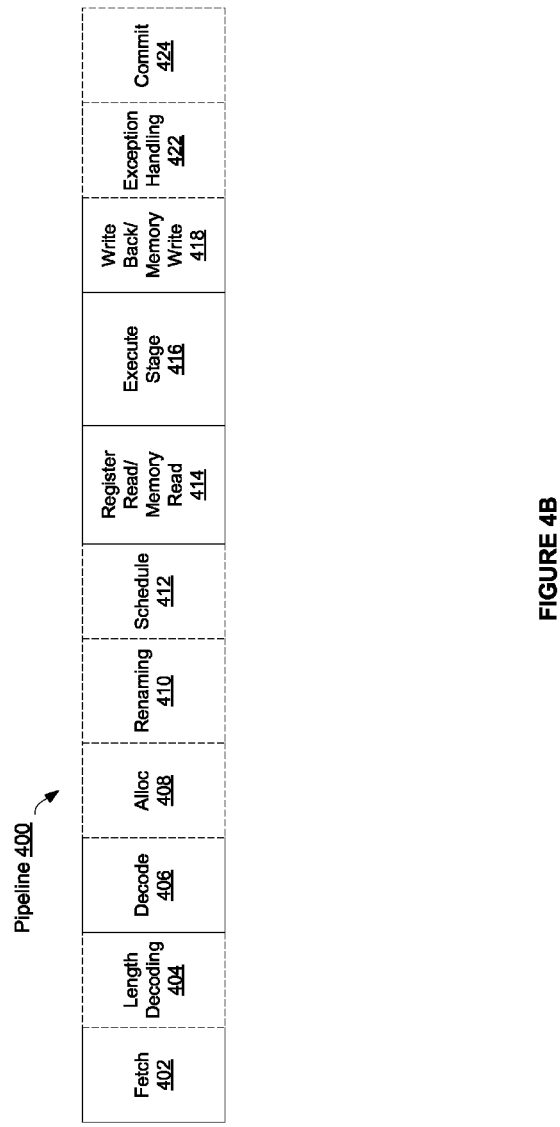
FIG. 4B is a block diagram illustrating an in-order pipeline and a register renaming stage, out-of-order issue/execution pipeline implemented according to at least one embodiment of the disclosure.

FIG. 4B is a block diagram illustrating an in-order pipeline and a register renaming stage, out-of-order issue/execution pipeline implemented by processing device 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
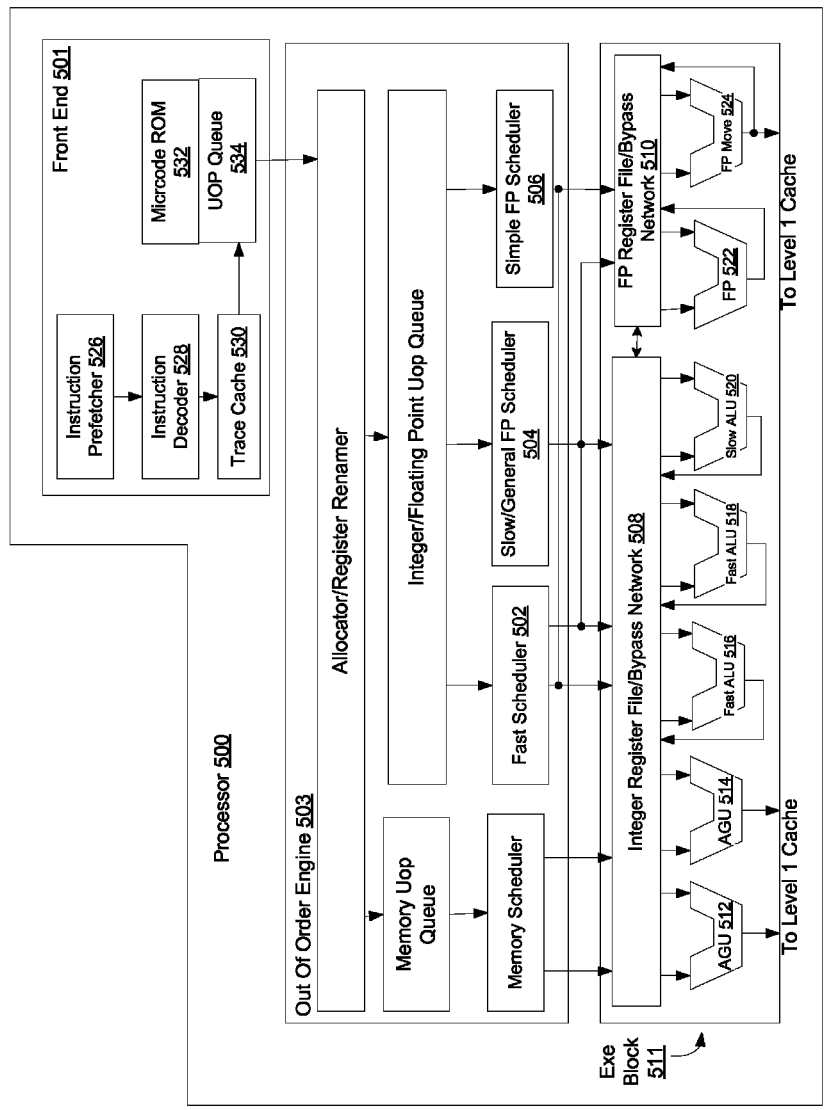
FIG. 5 illustrates a block diagram of the micro-architecture for a processor that includes logic circuits to perform minimizing bandwidth to track return targets by an ITS in accordance with one embodiment of the disclosure.

FIG. 5 illustrates a block diagram of the micro-architecture for a processor 500 that includes logic circuits to perform minimizing bandwidth to track return targets by an ITS in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to a entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement minimizing bandwidth to track return targets by an ITS according to embodiments of the disclosure. In one embodiment, the execution block 511 of processor 500 may include instruction tracing module, such as an ITS, to perform RET compression to minimize bandwidth to track RET targets according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6A:
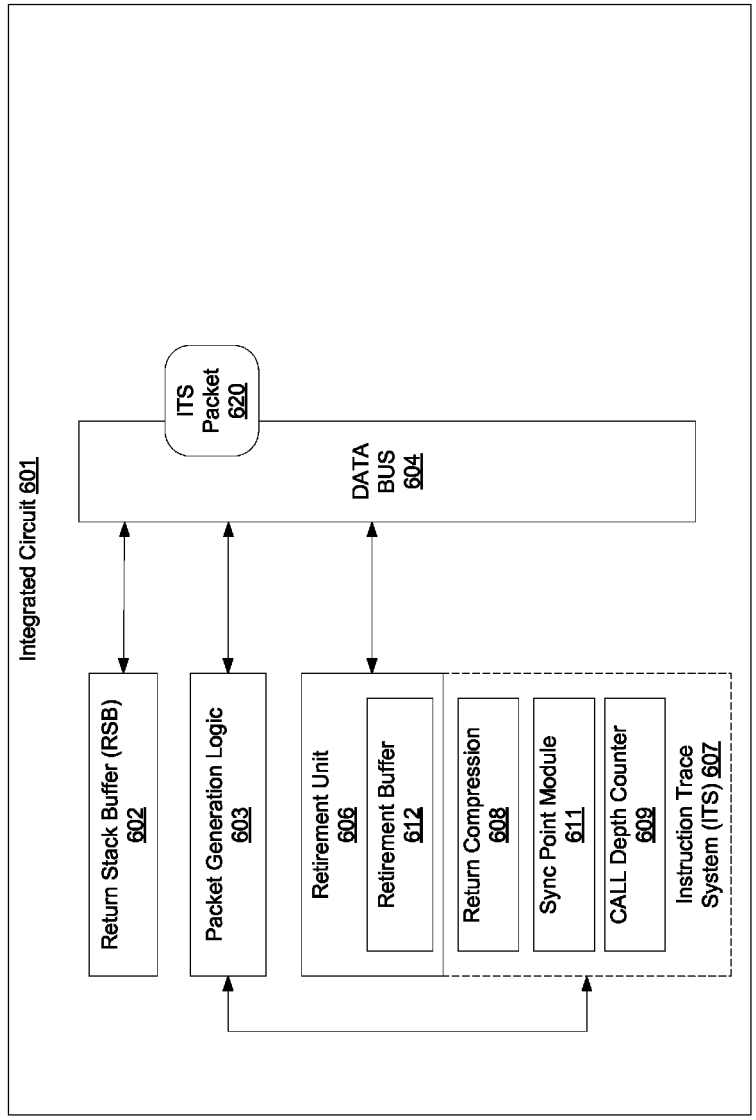
FIG. 6A illustrates an alternative exemplary architecture in accordance with which embodiments may operate.

FIG. 6A illustrates an alternative exemplary architecture in accordance with which embodiments may operate. In one embodiment, the integrated circuit 601 includes instruction tracing system (ITS) 607 to trace instructions of a traced application, mode, or code region, as the instructions are executed by the integrated circuit 601; packet generation logic 603 to generate a plurality of packets 602 describing the traced instructions; and a retirement unit 606 to compress a multi-bit RET target indication to a single bit RET target indication.

In one embodiment, the retirement unit 606 further includes a retirement buffer 612 and implements the ITS 607. The ITS 607 may implement a RET compression 608 unit, a sync point module 611, and a call depth counter (CDC) 609. In one embodiment, RET compression 608, sync point module 6011, and CDC 609 are the same as their similarly-named counterparts described with respect to FIG. 1.

In one embodiment, the integrated circuit is a Central Processing Unit (CPU). In one embodiment, the central processing unit is utilized for one of a tablet computing device or a smartphone. In accordance with one embodiment, such an integrated circuit 601 thus initiates instruction tracing (e.g., via ITS 607) for instructions of a traced application, mode, or code region, as the instructions are executed by the integrated circuit 601; generates a plurality of packets 620 describing the instruction tracing (e.g., via packet generation logic 603 as controlled by the ITS 607); and compresses a multi-bit indication of the target of a RET instruction (RETurn instruction) to a single bit indication of a well-behaved RET target (e.g., via the retirement unit 606 and specifically via functionality of the RET compression unit 608, sync point module 611, and CDC 609 working in conjunction with the retirement buffer 612).

In one embodiment, the integrated circuit 601 compresses the multi-bit RET target indication to the single bit RET target indication by initiating instruction tracing for instructions executed by the integrated circuit, determining whether the RET instruction mispredicted, determining a value of a CDC, and when the RET instruction did not mispredict and when the value of the CDC is greater than zero, compressing the multi-bit RET target indication to a single-bit RET target indication.

Figure 6B:
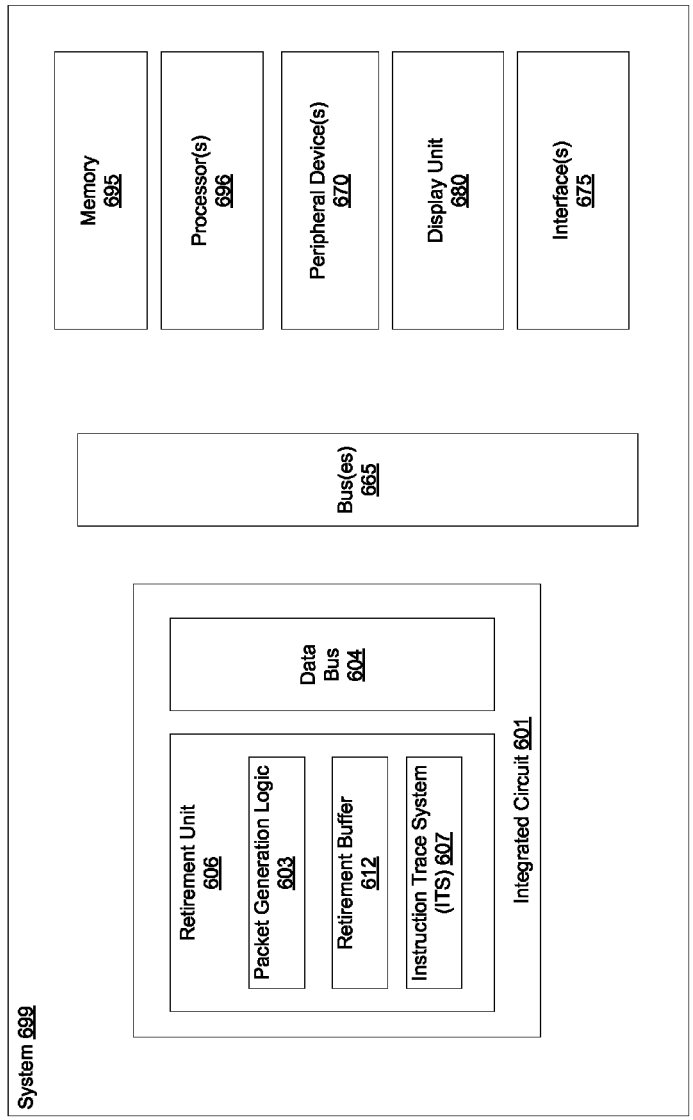
FIG. 6B shows a diagrammatic representation of a system in accordance with which embodiments may operate, be installed, integrated, or configured.

FIG. 6B shows a diagrammatic representation of a system 699 in accordance with which embodiments may operate, be installed, integrated, or configured. In one embodiment, system 699 includes a memory 695 and a processor or processors 696. For example, memory 695 may store instructions to be executed and processor(s) 696 may execute such instructions. System 699 includes communication bus(es) 665 to transfer transactions, instructions, requests, and data within system 699 among a plurality of peripheral device(s) 670 communicably interfaced with one or more communication buses 665 and/or interface(s) 675. Display unit 680 is additionally depicted within system 699.

Distinct within system 699 is integrated circuit 601 which may be installed and configured in a compatible system 699, or manufactured and provided separately so as to operate in conjunction with appropriate components of system 699.

In accordance with one embodiment, system 699 includes at least a display unit 680 and an integrated circuit 601. The integrated circuit 601 may operate as, for example, a processor or as another computing component of system 699. In such an embodiment, the integrated circuit 601 of system 699 includes at least: a data bus 604, packet generation logic 603 to generate a plurality of packets describing the traced instructions; and a retirement unit 606 to compress a multi-bit RET target address to a single bit RET target address indication. As discussed above, in some embodiments, the single-bit RET target address indication may be intermixed with conditional branch outcomes in the trace log output by the ITS 607.

In one embodiment, the retirement unit 606 further includes a retirement buffer 612 and implements the ITS 607. The retirement unit 606 may further implement the packet generation logic 603 in accordance with another embodiment.

In accordance with one embodiment, such a system 699 embodies a tablet or a smartphone, in which the display unit 680 is a touchscreen interface of the tablet or the smartphone; and further in which the integrated circuit 601 is incorporated into the tablet or smartphone.

Figure 7:
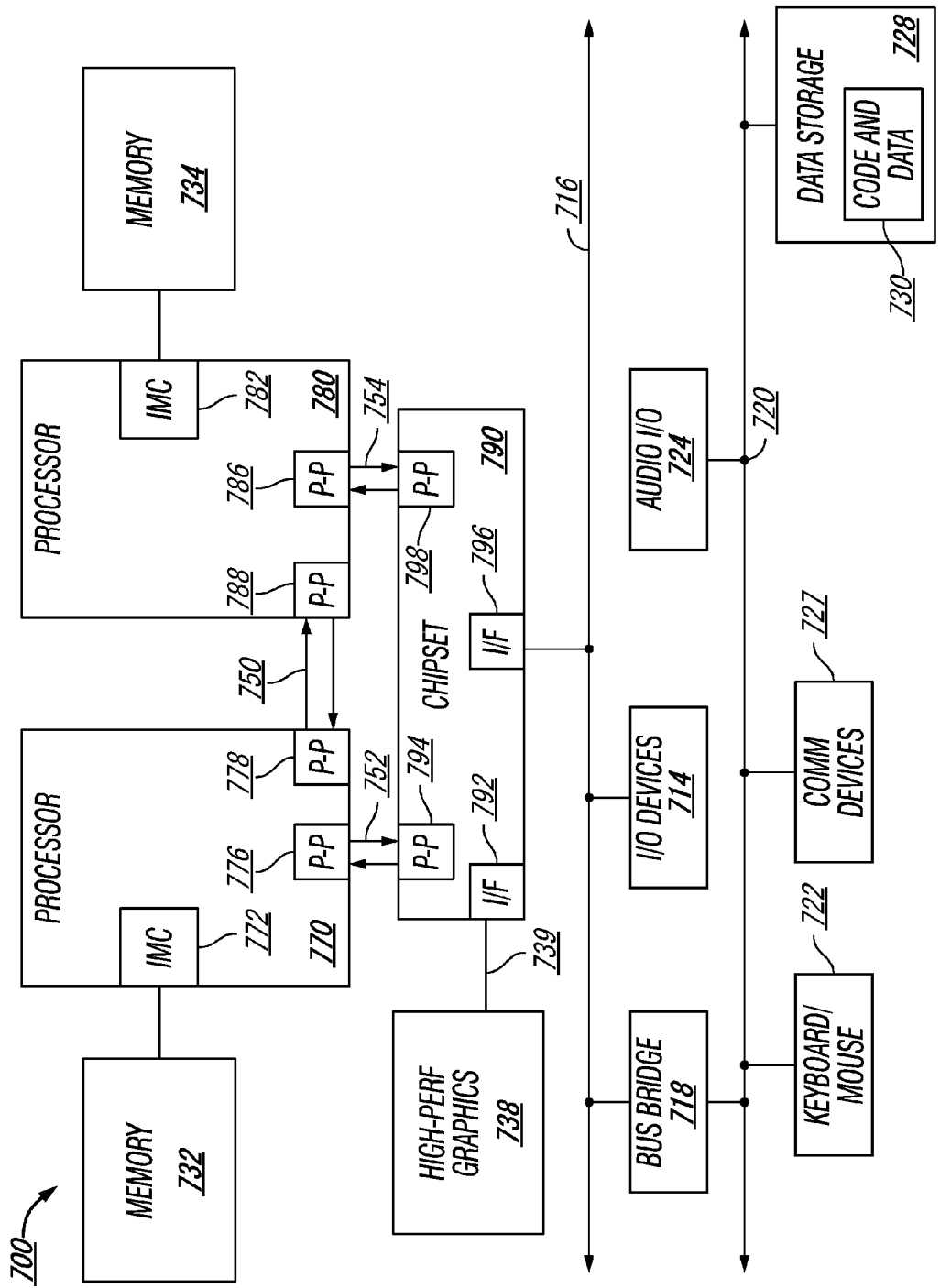
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement minimizing bandwidth to track return targets as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
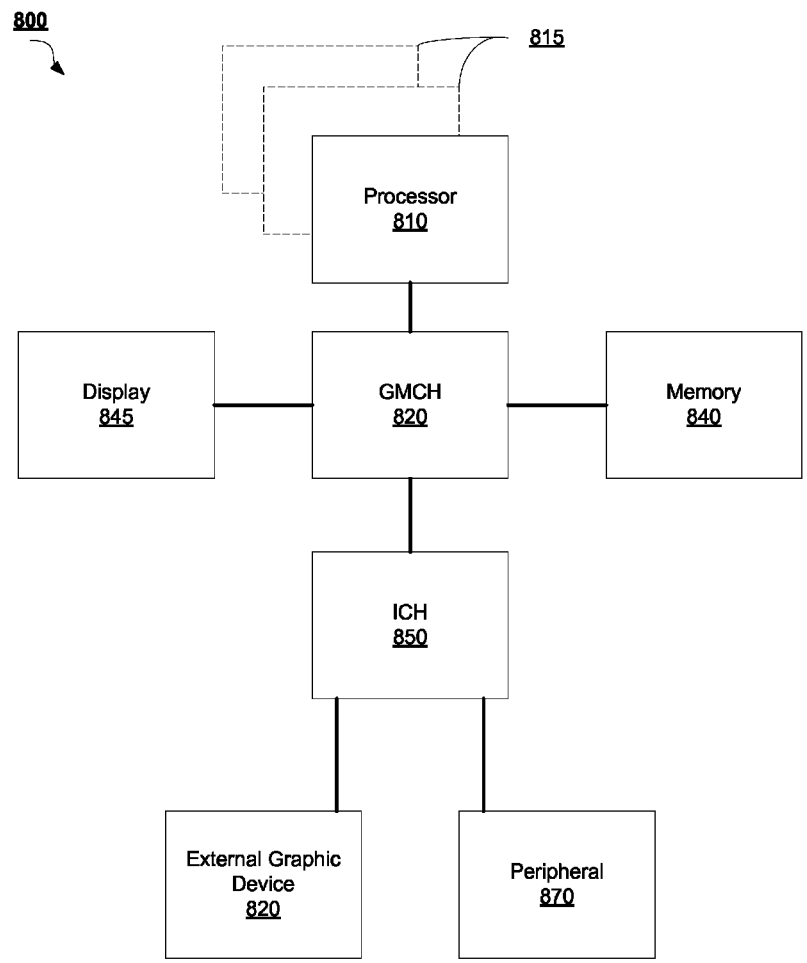
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement minimizing bandwidth to track return targets according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
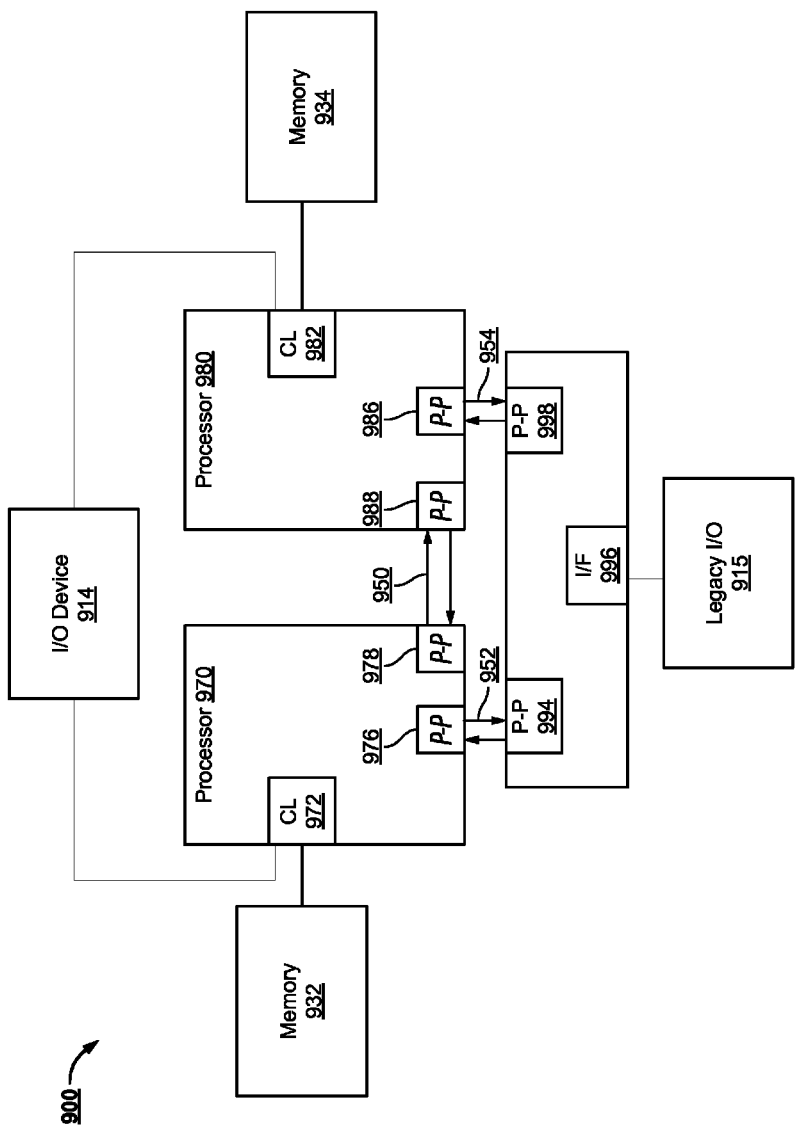
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement minimizing bandwidth to track return targets as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
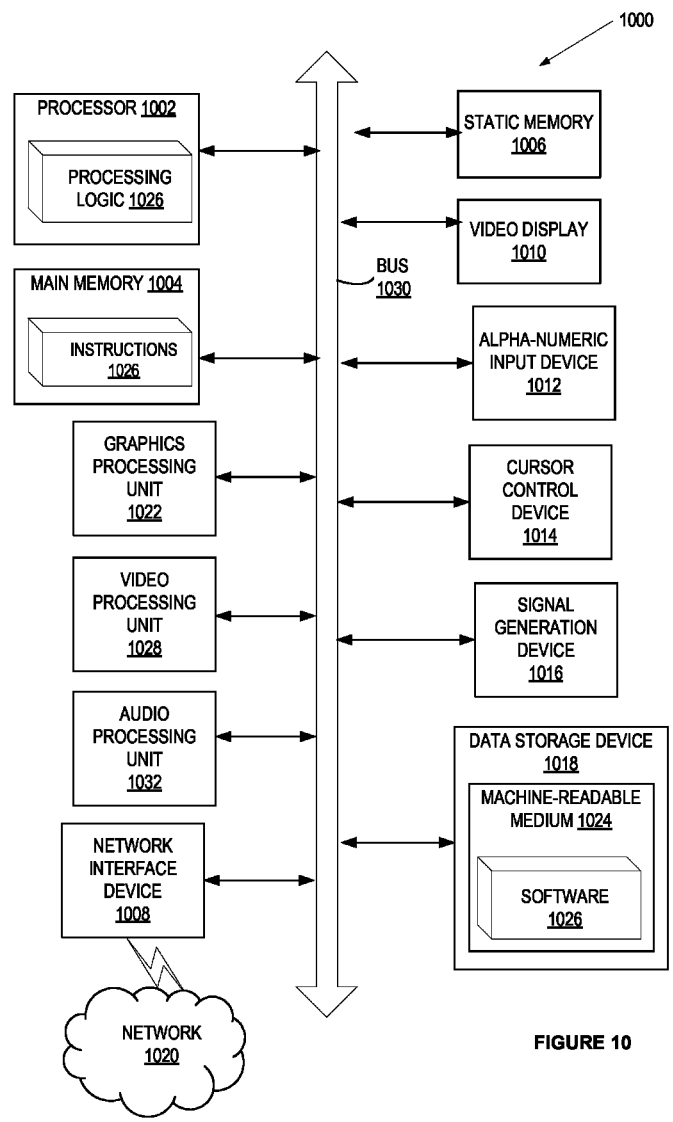
FIG. 10 illustrates a block diagram of one embodiment of a computer system.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or processing cores. The processing device 1002 is configured to execute the processing logic 1026 for performing the operations and steps discussed herein. In one embodiment, processing device 1002 is the same as processor architecture 100 described with respect to FIG. 1 that implements minimizing bandwidth to track return targets as described herein with embodiments of the disclosure.

The computer system 1000 may further include a network interface device 1008 communicably coupled to a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker). Furthermore, computer system 1000 may include a graphics processing unit 1022, a video processing unit 1028, and an audio processing unit 1032.

The data storage device 1018 may include a machine-accessible storage medium 1024 on which is stored software 1026 implementing any one or more of the methodologies of functions described herein, such as implementing an RS with restricted entries as described above. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 implementing ITS logic for minimizing bandwidth to track return targets such as described with respect to ITS 155 in FIG. 1, and/or a software library containing methods that call the above applications. While the machine-accessible storage medium 1028 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for implementing minimizing bandwidth to track return targets by an instruction tracing system (ITS) comprising an instruction fetch unit comprising a return stack buffer (RSB) to predict a target address of a return (RET) instruction corresponding to a call (CALL) instruction and a retirement unit comprising an instruction tracing module. Further to Example 1, the instruction tracking module is to initiate instruction tracing for instructions executed by the processing device, determine whether the target address of the RET instruction was mispredicted, determine a value of a call depth counter (CDC) maintained by the instruction tracing module, and when the target address of the RET instruction was not mispredicted and when the value of the CDC is greater than zero, generate an indication that the RET instruction branches to a next linear instruction after the corresponding CALL instruction.

In Example 2, the subject matter of Example 1 can optionally include further comprising the instruction tracing module to provide the indication as part of a plurality of packets describing the instruction tracing, and wherein the indication is smaller than a size of the target address of the RET instruction. In Example 3, the subject matter of any one of Examples 1-2 can optionally include wherein the instruction tracing module to increment the CDC when a CALL instruction retires from the retirement unit and to decrement the CDC when a RET instruction retires from the retirement unit.

In Example 4, the subject matter of any one of Examples 1-3 can optionally include wherein the CDC is configured to saturate at a value equal to a depth of the RSB and at a value of zero. In Example 5, the subject matter of any one of Examples 1-4 can optionally include wherein the instruction tracing module to determine whether the RET instruction mispredicted further comprises the instruction tracing module to receive an indication from an execution unit of the processing device of the misprediction.

In Example 6, the subject matter of any one of Examples 1-5 can optionally include wherein when the RET instruction mispredicts or when the value of the CDC is equal to zero, the instruction tracing module to provide a full target address for the RET instruction as part of the instruction tracing. In Example 7, the subject matter of any one of Examples 1-6 can optionally include wherein the instruction tracing module further to reset the value of the CDC to zero when an indication of a misprediction of a RET instruction is received. In Example 8, the subject matter of any one of Examples 1-7 can optionally include wherein the instruction tracing module further to reset the value of the CDC to zero when an indication of any misprediction by the processing device is received.

In Example 9, the subject matter of any one of Examples 1-8 can optionally include wherein the instruction tracing module further to reset the value of the CDC to zero when an indication of disabling of the instruction tracing is received. In Example 10, the subject matter of any one of Examples 1-9 can optionally include wherein the instruction tracing module further to reset the value of the CDC to zero when an indication of a synchronization packet of the instruction tracing is received.

In Example 11, the subject matter of any one of Examples 1-10 can optionally include wherein the synchronization packet is a boundary packet (BP). In Example 12, the subject matter of any one of Examples 1-11 can optionally include wherein the RET instruction comprises an indirect jump whose target address is removed from a top of a software stack of the processing device. All optional features of the apparatus described above may also be implemented with respect to the method or process described herein.

Example 13 is a method for implementing minimizing bandwidth to track return targets comprising initiating instruction tracing for instructions executed by a processing device, determining whether a target address of a return (RET) instruction was mispredicted, wherein the RET instruction corresponds to a call (CALL) instruction, determining a value of a call depth counter (CDC), and when the target address of the RET instruction was not mispredicted and when the value of the CDC is greater than zero, generating an indication that the RET instruction branches to a next linear instruction after the corresponding CALL instruction.

In Example 14, the subject matter of Examples 13 can optionally include further comprising providing the indication as part of a plurality of packets describing the instruction tracing, wherein the indication is smaller than a size of the target address of the RET instruction. In Example 15, the subject matter of any one of Examples 13-14 can optionally include further comprising incrementing the CDC when a CALL instruction retires from a retirement unit of the processing device, and decrementing the CDC when a RET instruction retires from the retirement unit.

In Example 16, the subject matter of any one of Examples 13-15 can optionally include wherein the CDC is configured to saturate at a value equal to a depth of the RSB and at a value of zero. In Example 17, the subject matter of any one of Examples 13-16 can optionally include wherein the determining whether the RET instruction mispredicted further comprises receiving an indication from an execution unit of the processing device of the misprediction. In Example 18, the subject matter of any one of Examples 13-17 can optionally include wherein when the RET instruction mispredicts or when the value of the CDC is equal to zero, providing a full target address for the RET instruction as part of the instruction tracing.

In Example 19, the subject matter of any one of Examples 13-18 can optionally include further comprising resetting the value of the CDC to zero when an indication of a misprediction of a RET instruction is received, resetting the value of the CDC to zero when an indication of disabling of the instruction tracing is received, and resetting the value of the CDC to zero when an indication of a synchronization packet of the instruction tracing is received. In Example 20, the subject matter of any one of Examples 13-19 can optionally include wherein the synchronization packet is a boundary packet (BP). In Example 21, the subject matter of any one of Examples 13-20 can optionally include further comprising resetting the value of the CDC to zero when an indication of any misprediction by the processing device is received. In Example 22, the subject matter of any one of Examples 13-21 can optionally include wherein the RET instruction comprises an indirect jump whose target address is removed from a top of a software stack of the processing device.

Example 23 is a system for implementing minimizing bandwidth to track return targets. In Example 23 the system includes a memory and a processing device communicably coupled to the memory, the processing device comprising a memory and a processing device communicably coupled to the memory, the processing device comprising an instruction tracing module. Further to Example 23, the instruction tracing module to initiate instruction tracing for instructions executed by the processing device, determine whether a target address of a return (RET) instruction was mispredicted, wherein the RET instruction corresponds to a call (CALL) instruction, determine a value of a call depth counter (CDC), and when the target address of the RET instruction was not mispredicted and when the value of the CDC is greater than zero, generate an indication that the RET instruction branches to a next linear instruction after the corresponding CALL instruction.

In Example 24, the subject matter of Example 23 can optionally include wherein the instruction tracing module further to provide the indication as part of a plurality of packets describing the instruction tracing, and wherein the indication is smaller than a size of the target address of the RET instruction. In Example 25, the subject matter of any one of Examples 23-24 can optionally include wherein the instruction tracing module to increment the CDC when a CALL instruction retires from a retirement unit of the processing device and to decrement the CDC when a RET instruction retires from the retirement unit, and wherein the CDC is configured to saturate at a value equal to a depth of the RSB and at a value of zero. In Example 26, the subject matter of any one of Examples 23-25 can optionally include wherein the instruction tracing module to determine whether the RET instruction mispredicted further comprises the instruction tracing module to receive an indication from an execution unit of the processing device of the misprediction.

In Example 27, the subject matter of any one of Examples 23-26 can optionally include wherein when the RET instruction mispredicts or when the value of the CDC is equal to zero, the instruction tracing module to provide a full target address for the RET instruction as part of the instruction tracing. In Example 28, the subject matter of any one of Examples 23-27 can optionally include wherein the instruction tracing module further to reset the value of the CDC to zero when an indication of a misprediction of a RET instruction is received, reset the value of the CDC to zero when an indication of disabling of the instruction tracing is received, and reset the value of the CDC to zero when an indication of a synchronization packet of the instruction tracing is received.

In Example 29, the subject matter of any one of Examples 23-28 can optionally include wherein the synchronization packet is a boundary packet (BP). In Example 30, the subject matter of any one of Examples 23-29 can optionally include wherein the instruction tracing module further to reset the value of the CDC to zero when an indication of any misprediction by the processing device is received. In Example 31, the subject matter of any one of Examples 23-30 can optionally include wherein the RET instruction comprises an indirect jump whose target address is removed from a top of a software stack of the processing device. All optional features of the system described above may also be implemented with respect to the method or process described herein.

Example 32 is non-transitory computer-readable medium for implementing minimizing bandwidth to track return targets. In Example 32, the non-transitory machine-readable medium includes data that, when accessed by a processing device, cause the processing device to perform operations comprising initiating instruction tracing for instructions executed by a processing device, determining whether a target address of a return (RET) instruction was predicted, wherein the RET instruction corresponds to a call (CALL) instruction, determining a value of a call depth counter (CDC), and when the target address of the RET instruction was not mispredicted and when the value of the CDC is greater than zero, generating an indication that the RET instruction branches to a next linear instruction after the corresponding CALL instruction.

In Example 33, the subject matter of Example 32 can optionally include wherein the operations further comprise providing the indication as part of a plurality of packets describing the instruction tracing, and wherein the indication is smaller than a size of the target address of the RET instruction. In Example 34, the subject matter of any one of Examples 32-33 can optionally include wherein the operations further comprise incrementing the CDC when a CALL instruction retires from a retirement unit of the processing device, and decrementing the CDC when a RET instruction retires from the retirement unit, wherein the CDC is configured to saturate at a value equal to a depth of a return stack buffer (RSB) of the processing device and at a value of zero.

In Example 35, the subject matter of any one of Examples 32-34 can optionally include wherein the determining whether the RET instruction mispredicted further comprises receiving an indication from an execution unit of the processing device of the misprediction. In Example 36, the subject matter of any one of Examples 32-35 can optionally include wherein the operations further comprise when the RET instruction mispredicts or when the value of the CDC is equal to zero, providing a full target address for the RET instruction as part of the instruction tracing. In Example 37, the subject matter of any one of Examples 32-36 can optionally include wherein the operations further comprise resetting the value of the CDC to zero when an indication of a misprediction of a RET instruction is received, resetting the value of the CDC to zero when an indication of disabling of the instruction tracing is received, and resetting the value of the CDC to zero when an indication of a synchronization packet of the instruction tracing is received.

In Example 38, the subject matter of any one of Examples 32-37 can optionally include wherein the operations further comprise resetting the value of the CDC to zero when an indication of any misprediction by the processing device is received. In Example 39, the subject matter of any one of Examples 32-38 can optionally include wherein the synchronization packet is a boundary packet (BP). In Example 40, the subject matter of any one of Examples 32-39 can optionally include wherein the RET instruction comprises an indirect jump whose target address is removed from a top of a software stack of the processing device.

Example 41 is an apparatus for implementing minimizing bandwidth to track return targets comprising means for initiating instruction tracing for instructions executed by a processing device, means for determining whether a target address of a return (RET) instruction was mispredicted, wherein the RET instruction corresponds to a call (CALL) instruction, means for determining a value of a call depth counter (CDC), and means for generating an indication that the RET instruction branches to a next linear instruction after the corresponding CALL instruction when the target address of the RET instruction was not mispredicted and when the value of the CDC is greater than zero. In Example 42, the subject matter of Example 41 can optionally include the apparatus further configured to perform the method of any one of the Examples 13 to 20.

Example 43 is at least one machine readable medium comprising a plurality of instructions that in response to being executed on a computing device, cause the computing device to carry out a method according to any one of Examples 13-22. Example 45 is an apparatus for implementing minimizing bandwidth to track return targets by an ITS, configured to perform the method of any one of Examples 13-22. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   an instruction fetch unit comprising a return stack buffer (RSB) to predict a target address of a return (RET) instruction corresponding to a call (CALL) instruction;
   a retirement unit comprising an instruction tracing module to:
      initiate instruction tracing for instructions executed by the processing device;
      determine whether the target address of the RET instruction was mispredicted;
      determine a value of a call depth counter (CDC) maintained by the instruction tracing module; and
      when the target address of the RET instruction was not mispredicted and when the value of the CDC is greater than zero, generate an indication that the RET instruction branches to a next linear instruction after the corresponding CALL instruction.

2. The processing device of claim 1, further comprising the instruction tracing module to provide the indication as part of a plurality of packets describing the instruction tracing, and wherein the indication is smaller than a size of the target address of the RET instruction.

3. The processing device of claim 1, wherein the instruction tracing module to increment the CDC when a CALL instruction retires from the retirement unit and to decrement the CDC when a RET instruction retires from the retirement unit.

4. The processing device of claim 3, wherein the CDC is to saturate at a value equal to a depth of the RSB and at a value of zero.

5. The processing device of claim 1, wherein the instruction tracing module to determine whether the RET instruction mispredicted further comprises the instruction tracing module to receive an indication from an execution unit of the processing device of the misprediction.

6. The processing device of claim 1, wherein when the RET instruction mispredicts or when the value of the CDC is equal to zero, the instruction tracing module to provide a full target address for the RET instruction as part of the instruction tracing.

7. The processing device of claim 1, wherein the instruction tracing module further to reset the value of the CDC to zero when an indication of a misprediction of a RET instruction is received.

8. The processing device of claim 1, wherein the instruction tracing module further to reset the value of the CDC to zero when an indication of any misprediction by the processing device is received.

9. The processing device of claim 1, wherein the instruction tracing module further to reset the value of the CDC to zero when an indication of disabling of the instruction tracing is received.

10. The processing device of claim 1, wherein the instruction tracing module further to reset the value of the CDC to zero when an indication of a synchronization packet of the instruction tracing is received.

11. A method, comprising:
   initiating instruction tracing for instructions executed by a processing device;
   determining whether a target address of a return (RET) instruction was mispredicted, wherein the RET instruction corresponds to a call (CALL) instruction;
   determining a value of a call depth counter (CDC); and
   when the target address of the RET instruction was not mispredicted and when the value of the CDC is greater than zero, generating an indication that the RET instruction branches to a next linear instruction after the corresponding CALL instruction.

12. The method of claim 11, further comprising providing the indication as part of a plurality of packets describing the instruction tracing, wherein the indication is smaller than a size of the target address of the RET instruction.

13. The method of claim 11, further comprising:
   incrementing the CDC when a CALL instruction retires from a retirement unit of the processing device; and
   decrementing the CDC when a RET instruction retires from the retirement unit.

14. The method of claim 11, wherein when the RET instruction mispredicts or when the value of the CDC is equal to zero, providing a full target address for the RET instruction as part of the instruction tracing.

15. The method of claim 11, further comprising:
   resetting the value of the CDC to zero when an indication of a misprediction of a RET instruction is received;
   resetting the value of the CDC to zero when an indication of disabling of the instruction tracing is received; and
   resetting the value of the CDC to zero when an indication of a synchronization packet of the instruction tracing is received.

16. The method of claim 11, further comprising resetting the value of the CDC to zero when an indication of any misprediction by the processing device is received.

17. An system comprising:
   a memory to store a trace log generated by an instruction tracking module;
   a processing device communicably coupled to the memory, the processing device comprising the instruction tracing module to:
      initiate instruction tracing for instructions executed by the processing device;
      determine whether a target address of a return (RET) instruction was mispredicted, wherein the RET instruction corresponds to a call (CALL) instruction;
      determine a value of a call depth counter (CDC); and
      when the target address of the RET instruction was not mispredicted and when the value of the CDC is greater than zero, generate an indication that the RET instruction branches to a next linear instruction after the corresponding CALL instruction.

18. The system of claim 17, wherein the instruction tracing module further to provide the indication as part of a plurality of packets describing the instruction tracing, and wherein the indication is smaller than a size of the target address of the RET instruction.

19. The system of claim 17, wherein the instruction tracing module to increment the CDC when a CALL instruction retires from a retirement unit of the processing device and to decrement the CDC when a RET instruction retires from the retirement unit, and wherein the CDC is to saturate at a value equal to a depth of the RSB and at a value of zero.

20. The system of claim 17, wherein the instruction tracing module further to:
   reset the value of the CDC to zero when an indication of a misprediction of a RET instruction is received;
   reset the value of the CDC to zero when an indication of disabling of the instruction tracing is received; and
   reset the value of the CDC to zero when an indication of a synchronization packet of the instruction tracing is received.

* * * * *